United States Patent [19]

Hibyan et al.

[11] Patent Number: 4,568,245

[45] Date of Patent: Feb. 4, 1986

[54] COMPOSITE HELICOPTER ROTOR HUB

[75] Inventors: Edward S. Hibyan, Trumbull; George J. Wehnert, Madison; Thomas J. Toner, Milford, all of Conn.; Francis E. Byrnes, Jr., White Plains, N.Y.; Peter C. Ogle, Woodbridge, Conn.

[73] Assignee: United Technologies Corporation, Hartford, Conn.

[21] Appl. No.: 477,708

[22] Filed: Mar. 22, 1983

[51] Int. Cl.[4] ............................................. B64C 27/38
[52] U.S. Cl. ................... 416/134 A; 416/230; 416/141
[58] Field of Search ............... 416/134 A, 138 A, 141, 416/238 A, 244 R

[56] References Cited

U.S. PATENT DOCUMENTS

| 4,195,967 | 4/1980 | Weiland | 416/134 A |
|---|---|---|---|
| 4,257,738 | 3/1981 | Schwarz et al. | 416/134 A |
| 4,321,013 | 3/1982 | Schwarz et al. | 416/244 R |
| 4,342,540 | 8/1982 | Lovera et al. | 416/140 |
| 4,345,876 | 8/1982 | Schwartz et al. | 416/134 A |
| 4,352,632 | 10/1982 | Schwarz et al. | 416/134 A |
| 4,369,019 | 1/1983 | Lovera et al. | 416/134 A |
| 4,425,082 | 1/1984 | Mussi et al. | 416/134 A X |
| 4,427,340 | 1/1984 | Metzger et al. | 416/141 |

FOREIGN PATENT DOCUMENTS 3037824  5/1982  Fed. Rep. of Germany ... 416/244 D

Primary Examiner—Everette A. Powell, Jr.
Attorney, Agent, or Firm—Alan C. Cohen

[57] ABSTRACT

A composite helicopter rotor hub is described having a composite retention plate, yokes and torque tubes. The retention plate is made up of graphite and glass fiber reinforced epoxy resin. The graphite fiber reinforcement is in-plane isotropically laid continuous graphite fibers and the glass fiber reinforcement comprises segments of fiberglass continuously and circumferentially wound around the areas of retention. The yoke is made up of glass fibers unidirectionally oriented in the direction of principle stress, i.e., along the length of the yoke. The yoke also has clevis sections on either end and the clevis sections additionally contain multiaxially oriented multiple plies of unidirectionally oriented continuous graphite fibers interleaved with the unidirectionally oriented continuous glass fibers. The torque tube contains upper and lower load bearing surfaces connected by two sidewall portions. Both the sidewall and load bearing portions contain filament wound glass fiber reinforced epoxy resin such fibers having a ±45° orientation. The upper and lower load bearing portions additionally contain multiaxially oriented multiple plies of unidirectionally oriented continuous graphite fibers interleaved with the glass fibers. The particular materials selected combined in the unique manner described provide the individual components as well as the entire hub assembly with crack resistance, damage tolerance, light weight, strength and integrity inspectability.

1 Claim, 7 Drawing Figures

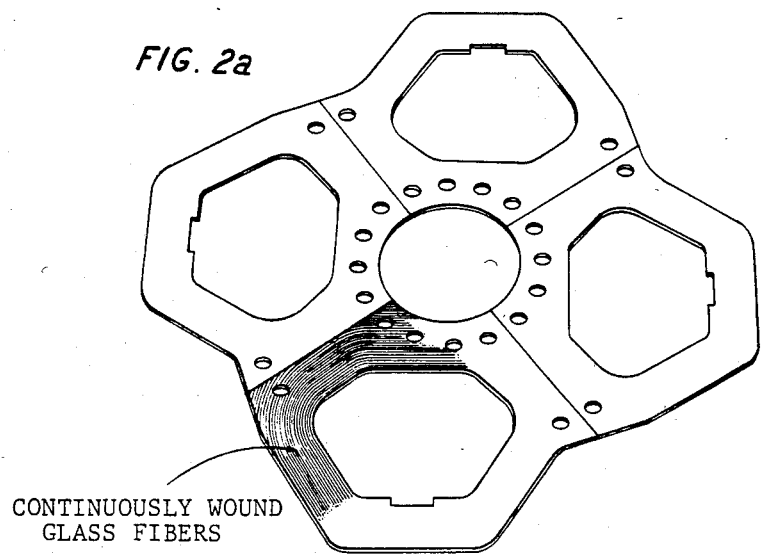
FIG. 2a
CONTINUOUSLY WOUND
GLASS FIBERS
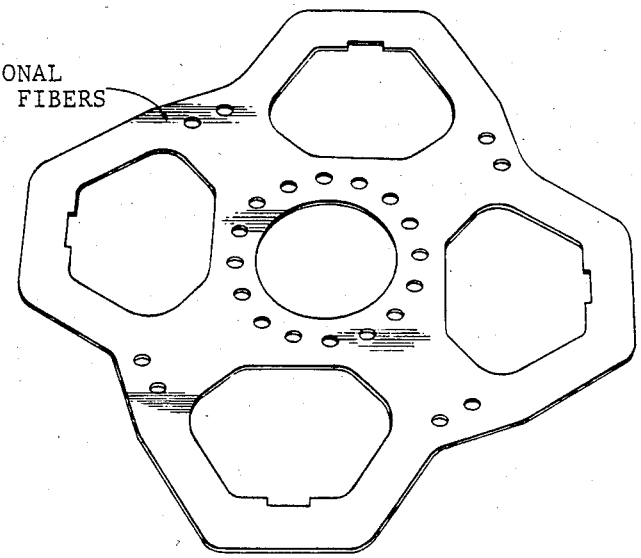
UNIDIRECTIONAL
GRAPHITE FIBERS
FIG. 2b
FIG. 3
GLASS
GRAPHITE

COMPOSITE HELICOPTER ROTOR HUB

CROSS REFERENCE TO RELATED APPLICATIONS

Attention is directed to the following copending, commonly assigned U.S. patent applications, filed on even date herewith, the disclosures of which are incorporated by reference: Ser. No. 477,696 filed in the names of Peter C. Ogle, George J. Wehnert, and Francis E. Byrnes, Jr. and entitled "A Fiber Reinforced-/Epoxy Matrix Composite Helicopter Rotor Main Hub Plate"; Ser. No. 477,701 filed in the names of Peter C. Ogle, Edward S Hibyan and Thomas J. Toner and entitled "Fiber Reinforced/Epoxy Matrix Composite Helicopter Rotor Yoke"; and Ser. No. 477,709 filed in the names of Peter C. Ogle, George J. Wehnert, Thomas J. Toner, Francis E. Byrnes, Jr., and Edward S. Hibyan and entitled "Fiber Reinforced/Epoxy Matrix Composite Helicopter Rotor Torque Tube".

DESCRIPTION

1. Technical Field

The field of art to which this invention pertains is helicopter rotor hubs and particularly rotor hubs comprising fiber reinforced epoxy matrix composites.

2. Background Art

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and damage tolerance.

Weight has always been a consideration in helicopter construction and with increasing fuel costs it has become a primary objective, i.e. to reduce the weight of the overall helicopter by using lighter materials. At present aluminum and titanium are used extensively because of their light weight and strength, however, there is a constant search for lighter and stronger materials. In addition, these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such netal components, the industry has taken two approaches. One is to build a redundant component so that should one fail the other will allow for a safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin e.g. note British Patent No. 2,092,541. Such hubs are of such complicated design as to make them costly to fabricate, and having fewer component parts, produce an increased number of failure points.

Accordingly, what is needed in this art are damage tolerant, relatively inexpensive and light weight composite components capable of withstanding the forces developed in a helicopter rotor hub assembly.

DISCLOSURE OF THE INVENTION

The present invention is directed to a composite main helicopter rotor hub. The hub is made up of a main retention plate, a plurality of yokes, and a plurality of torque tubes. The retention plate is made up of layers of graphite fibers and glass fibers laid up and interleaved in an epoxy resin matrix in specific manner. The glass fibers are present as segments of continuous fibers wound in a plane circumferentially around the central axes of the areas of retention. The graphite fibers are continuous fibers inplane isotropically laid in a plane parallel to the plane of the glass fibers. The layers of fibers are symmetrically interleaved so as to provide light weight, strength, crack resistance, damage tolerance and integrity inspectability to the retention plate, without the need for redundant parts or overdesigned components.

The yoke is also made up of layers of graphite fibers and glass fibers laid up and interleaved in an epoxy resin matrix in specific manner. The yoke is U-shaped with a clevis section at each end. The glass fiber reinforcement is present in the yoke as unidirectionally oriented continuous fibers along the length of the yoke. In the clevis sections continuous graphite fibers in a 0° and ±45° orientation are interleaved with the continuous glass fibers so as to also produce crack resistance, damage tolerance, and integrity inspectability to the yoke, without the need for redundant parts or overdesigned components.

The torque tube is also made up of layers of graphite fibers and glass fibers laid up and interleaved in an epoxy resin matrix in specific manner. The glass fibers are present in the torque tube continuously filament wound and oriented substantially in a ±45° orientation. The upper and lower main load bearing portions also contain, interleaved with the continuous glass fibers, continuous fiber graphite packs made up of a plurality of plies of graphite fibers in a 0° and ±45° orientation. The amount of graphite fibers in the 0° orientation should not exceed 50% of the total fibers in the torque tube. Selection of such materials oriented in the specified manner also results in a torque tube with crack resistance, damage tolerance, integrity inspectability, light weight, and high strength, without the need for redundant parts or overdesigned components.

BRIEF DESCRIPTION OF THE DRAWINGS

FIG. 2a shows the continuously wound glass fibers of the retention plate according to the present invention.

FIG. 2b shows a single unidirectional ply of graphite fiber reinforcement according to the present invention.

FIG. 3 shows a sectional view of a retention plate according to the present invention.

BEST MODE FOR CARRYING OUT THE INVENTION

Figure 1:
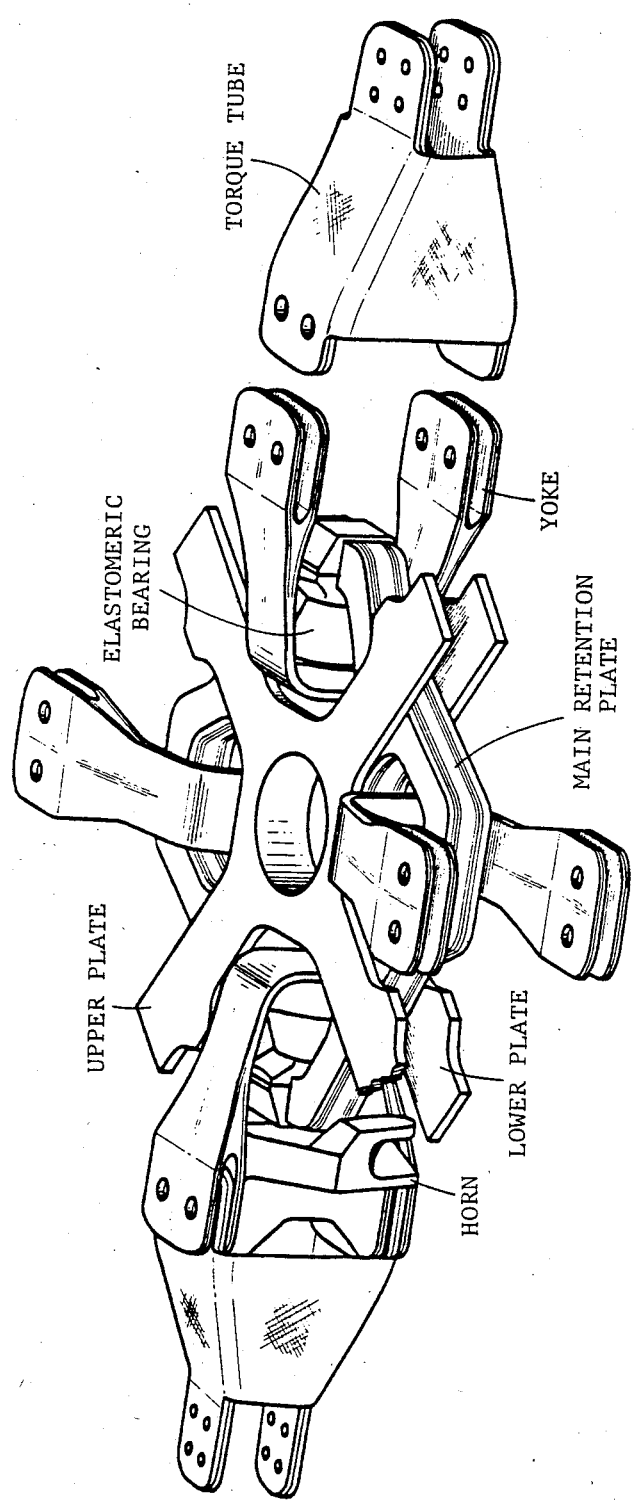
FIG. 1 shows a composite rotor hub assembly according to the present invention.

As the graphite fiber reinforcement, high strength graphite fiber may be used which has a minimum filament modulus of $30 \times 10^6$ psi These filaments may be purchased preimpregnated with an epoxy resin in the form of a multifilament collimated graphite tape in sheet form from Narmco Materials Inc., Costa Mesa, Calif. These tapes range anywhere from about 1 to about 18 inches wide and are typically used with a width of about 12 inches. In this sheet form each sheet or ply of the graphite fiber bundles is about 0.012 inch in thickness, although sheets with 0.006 inch thicknesses are also available. The cured graphite/resin composite should contain about 50% to about 65% fibers by volume and a unidirectional cured layer should have a tensile modulus of about $17 \times 10^6$ to about $20 \times 10^6$ psi at room temperature. The individual fibers are generally about 0.35 to about 0.399 mil in diameter.

While any glass fiber material with the requisite physical properties can be used, the preferred glass fiber is an S-type which can also be obtained preimpregnated with epoxy resin from Narmco Materials Inc. The cured glass fiber/resin layer should have about 45% to about 60% fiber content by volume and a tensile strength of about 125,000 psi minimum as well as a longitudinal tensile modulus of about $5.1 \times 10^6$ to about $6.3 \times 10^6$ psi both measured at room temperature. As with the graphite fibers, the preimpregnated glass fibers are available in fiber bundle tows anywhere from 1/10 inch to 1 inch in width and about 0.0125 inch in thickness. Such tows cure out to a thickness of about 0.010 inch and are typically used in ⅛ inch widths. As with the graphite fibers, the preimpregnated glass fibers are also available in fiber bundle tapes anywhere from 1 inch to 18 inches in width and about 0.0125 inch in thickness. Such tapes cure out to a thickness of about 0.010 inch and are typically used in 12 inch widths.

The epoxy resin matrix should be selected so as to be compatible with the fiber reinforcement. It is also desirable that the epoxy resin be satisfactorily curable at low pressures i.e. about 20 to about 100 psig. Three such resin systems are available commercially, two from U. S. Polymeric designated as Resin Number 773and Resin Number E7K8, and the other from Narmco Materials Inc. designated as Resin Number 5225. While the graphite and glass fibers can be laid up and subsequently treated with the epoxy resin either by brushing or otherwise applying a coating composition of suitable carrier of the epoxy resin or resin coated just prior to laying up, the fibers are preferably laid up as commercially purchased, i.e. preimpregnated with the epoxy resin.

In the retention plate the graphite fibers are generally laid up as a pack of multiples of four sheets or plies, laid up in a 0° orientation, +45°, 90°, −45° respectively, to impart optimum physical properties to the pack. With the fibers thus oriented in the pack, the average or effective tensile modulus of the pack will be about $7 \times 10^6$ psi which is substantially the same as the tensile modulus of the unidirectionally oriented glass fiber lay-up.

In the yoke the relative amounts of the fibers are preferably constituted such that there are substantially equal effective amounts of fibers oriented in the 0° and ±45° directions. This is roughly equivalent to equal thicknesses of 0° oriented fibers and ±45° oriented fibers with a slight excess of 0° oriented fibers present because of the relative softness of the glass fibers as compared to the graphite fibers.

In the case of the main retention plate the graphite fibers are generally laid up first. They are in-plane isotropically laid, at angles of 0°, +45°, 90° and −45°. Also as stated above, while the graphite fibers can be laid up and subsequently treated with the epoxy resin either by brushing or otherwise applying a coating composition of suitable carrier of the epoxy resin or resin coated just prior to laying up, the fibers are preferably laid up as commercially purchased, i.e. preimpregnated with epoxy resin.

In laying up the fibers for the retention plate, the amount of graphite fibers should be at least equal to the amount of fiberglass fibers in the composite. While an excess of graphite fibers can be tolerated, an excess of fiberglass is not desirable, expecially in a series of adjacent sheets. This is particularly necessary for adjacent sheets because of the split plane between the fiberglass segments as shown in FIG. 2. With insufficient graphite fibers bridging these splits, structural failure of the retention plate could occur under load. Ideally, the thicknesses of graphite fiber layers are equal to the thicknesses of adjacent glass fiber layers throughout the composite plate, but certainly in the areas occupied by the glass fiber layers. Note FIG. 3.

As shown in FIG. 2 the glass fibers are laid up in four discrete sections, each section made up of a continuously wound glass fiber bundle, helically wound around the central axis of retention. When these sections are thus formed, they are formed such that the internal load path will always be along the length of the fibers.

Since the segments of glass fibers or "doilies" have a cured out thickness of about 0.10 inch (being ⅛ inch wide and helically wrapped widthwise in jelly-roll fashion) and the plies of graphite fibers have a thckness of about 0.012 inch, the retention plate as shown in FIG. 2 is formulated by laying up approximately 8 plies of the graphite fiber preimpregnated sheets in alternating orientation of 0°, +45°, 90°, −45°, followed by a laying up of 1 sheet of the preimpregnated glass fiber reinforcement, and the process repeated three times to obtain the first three laid up glass fiber layers. A thick mid-section of graphite plies is next laid up followed by a repeat of the above alternating ply stack lay-ups.

Each pack of 0°, +45°, 90° −45° graphite is cut to size with all of the major cavities cut out, using a clicker die. The unidirectional fiberglass wafers are first filament wound around a mandrel that is shaped to the retention cavity dimensions. There they are clicker die cut to form the quarter segment. The four sections are assembled on a layer of woven fiberglass to keep the pieces in proper position so the holes may be clicker die cut. The graphite plies also have the holes clicker cut in a secondary operation of multi-layer stack-ups. The graphite packs and the fiberglass wafers are then layered into a net size mold. It is then press molded to proper thickness using a time/temperature/pressure distribution established for the resin system being used. Typically epoxy resin systems are used which cure at about 340° F. to about 360° F., at pressures of about 60 psig to about 100 psig, in about 2 to about 4 hours. In this instance, the entire assembly is placed in a hot press and heated to approximately 350° F. at approximately 80 psig for approximately 2 hours to compress the assembly and cure the epoxy resin. The result is a main hub plate requiring only upper surface grinding for fine tolerances, reaming of the center hole for tight tolerance fit to the shaft and drilling of the attachment holes. (In view of the upper surface grinding, typically a non-symmetrical excess of graphite will be laid up in the uppermost portion of the plate to account for such grinding).

There should be enough glass fiber in the retention plate so that the glass fiber alone is sufficient to carry the entire projected load for that particular load bearing area for a short duration (e.g. a matter of hours). A good rule of thumb for the plate is that the amount of fiberglass wrap used should be sufficient to carry a 125% RPM centrifugal loading alone. The glass fiber thus provides a redundant load path as well as being a crack stopping agent interleaved within the graphite. It should be noted that the gross elastic modulus of the 0°, +45°, 90°, −45° graphite pack is very close to that of unidirectional fiberglass. This results in a very even loading of the material within the main hub plate, and keeps the shear stress low between the two materials. In other words, all of the material is working evenly.

As mentioned above, the thickness of the retention plate is a function of the bending and axial loads projected for the part to see. Ideally the glass fiber and graphite layers will be equally spaced throughout the retention plate. However, also as stated above, typically, only so much fiberglass is used to carry the entire projected load for short durations, and such fiberglass is laid up on the outermost sections of the plate with a thicker graphite fiber mid-section as shown in FIG. 3. It should also be noted that by virtue of matching the thicknesses of fiberglass to the thicknesses of graphite in adjacent layers that a uniformity of load carrying capability and stress strain properties is imparted to the retention plate throughout its entire thickness. In general the ratio of fiberglass to graphite fiber in the retention plate will be about 1 to 1 to about 1 to 3. While there is no limit on the amount of graphite fiber which can be present in the retention plate, a balance is generally made of weight considerations and overall physical properties needed for the particular design of retention plate, i.e. the stress-strain and load bearing limits required for any particular retention plate.

Through the selection of these particular materials and the unique configuration described, a relatively lightweight, non-critical material, damage tolerant, less notch sensitive component results. The component exhibits a unique combination of interlaminar shear strength, flexibility and crack resistance.

In order to evaluate the main hub, a quarter segment of the main hub plate (see FIG. 1) was fabricated and tested by placing it in an ultimate load test apparatus which applied outward pressure axially on opposing arms of the segment. Such tests demonstrated load carrying capabilities in excess of 100,000 lbs. and strain level capabilities in excess of 9,000 $\mu$ in./in. This further demonstrated that the addition of the glass fibers for fail-safe purposes did not reduce the ultimate load capability and the unique combination and orientation of fibers and matrix provided the lightest weight, highest structural component capability available.

The advanced retention plate of the present invention has many advantages over the existing metal hubs used. The first and foremost is the damage tolerant features which are built into the retention plate which are in addition to the safe life (overall part life) design. The composite plate weight projection will result in at least a 20% weight savings in addition to being stronger and lighter than existing systems. The number of parts will be reduced by approximately 12%. Materials and manufacturing costs should be lower than with existing systems and due to the simpler design and greater accessability it will be easier to replace parts. The inherent damage tolerance of the composite retention plate will extend the useful life of the hub and improve the repairability which will also reduce the operational costs. By damage tolerance is meant that the state of the structure when either damaged or having defects will have sufficient strength such that a resulting crack will be detected in a routine inspection prior to total failure of the part.

Figure 5:
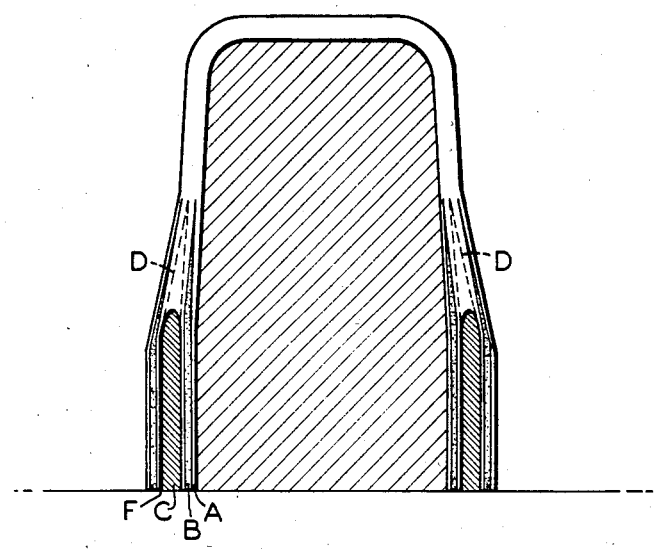
FIG. 5 shows a mold assembly for the yoke.

While the main body of the yoke can be formed by filament winding the glass fibers on a mandrel, the yoke is typically made by hand laying approximately 12 inch wide tapes of glass fiber preimpregnated with epoxy resin on a male mandrel. As shown in FIG. 5, the inner portion of the yoke A is laid up first with the layers of glass fiber preimpregnated tapes. It should be noted that the thicknesses of the glass fiber layers and graphite fiber layers as well as the overall thickness of the yoke are determined by the projected applied loads the yoke will see. This in turn is determined by the particular rotor system the component is being designed for. Typically, the strength properties of the yoke is designed to duplicate the strength of the metal parts being replaced, for example, the spindle cuff etc. The graphite packs B as described above are next inserted and are tapered by droping plies off so the peak shear stress in the yoke is kept to a minimum. Although as stated above the relative thicknesses are determined by the strength properties required for any particular system design, typically the thickness of the graphite pack at its thickest portion will be equal to the thickness of the glass fiber layers surrounding it on either side. This is true for both sides of the clevis.

The graphite fiber packs are comprised of multiaxially oriented multiple plies of unidirectionally oriented graphite fibers. That is to say that the graphite fibers in any one ply are continuous and unidirectionally oriented but the plies are stacked one atop the other in 0°, ±45° orientation.

Following insertion of the graphite pack the laying up of the continuous glass fibers is resumed. When an adequate thickness of glass fiber tapes is laid up clevis spacers C (FIG. 5) are inserted to produce the attachment spaces between the arms of the clevises 3 in FIG. 4. The laying up of the glass fibers and graphite fiber packs is repeated on the other side of the clevis spacer.

When the clevis spacer is inserted a wedge D of unidirectional fiberglass pack is inserted along with the spacer which separates the clevis sections and is designed to minimize the tendency of the clevis to split apart under impact loading. This is the same resin impregnated glass fiber utilized for the rest of the yoke.

If desired, to provide additional strength or wear resistance, a woven fiberglass or nylon scrim F (FIG. 5) can be placed on the interior of the clevis cavity prior to curing of the yoke. Typically such woven glass fiber scrim has 0°/90° glass fiber orientation and is approximately 0.03 inch thick. Other typical measurements for such a yoke are a clevis opening roughly equal to the length of the triangular shaped pack which is roughly equal to the length of the graphite pack taper portion. The body of the yoke (e.g. base of the U-shaped section) and the individual arms of the clevis sections are also typically acout the same width. Although these measurements will vary depending on hub design and load to be applied.

The thus formed yokes are then conventially autoclave cured and appropriate bolt hole attachments provided. A conventional vacuum bag can be used during curing to assist in holding the yoke component parts in place.

As with the retention plate typically epoxy resin systems are used which cure at about 340° F. to about 360° F., at pressures of about 60 psig to about 100 psig, in about 2 to about 4 hours. In this instance, the entire assembly is placed in an autoclave and heated to approximately 350° F. at approximately 80 psig for approximately 2 hours to compress the assembly and cure the epoxy resin. The result is a yoke requiring only drilling of the attachment holes.

Typically the basic mold used is wider than the width of the desired yoke width so, for example two or more yokes can be machined from the cured lay-up. An alternative manufacturing approach is to filament wind the unidirectional glass fibers with the graphite packs layed up at an appropriate time, with the yokes back to back. In this manner any quantity of yokes in increments of two (2, 4, 6, 8 etc.) can be filament wound simultaneously. This could result in substantial savings in manufacturing time and man hours. Conventional metal plugs or other attaching means can be bonded in at this time.

Figure 4:
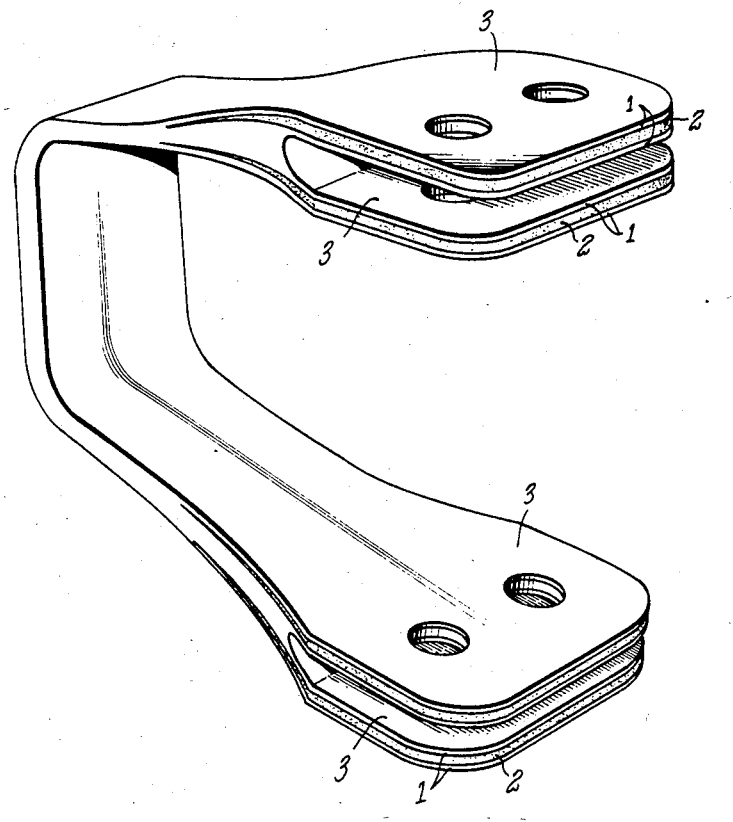
FIG. 4 shows a composite yoke according to the present invention.

In FIG. 4 a yoke according to the present invention is shown with the glass fiber partion shown as 1 and the graphite packs as 2. In FIG. 1 showing a composite rotor hub assembly, the yokes according to the present invention are shown as indicated.

While there is no limit on the amount of graphite fiber which can be present in the yoke, a balance is generally made of weight considerations and overall physical properties needed for the particular design of yoke i.e. the stress-strain and load bearing limits required for any particular yoke. Through the selection of these particular materials and the unique configuration described, a relatively light weight, non-critical material damage tolerant less notch sensitive, component results. The component exhibits a unique combination of interlaminar shear strength, flexibility and crack resistance.

The yoke, being the intermediate structure which connects the elastomeric bearing to the torque tube and pitch arm has two critical areas. These highly stressed areas are at the in board radius where the yoke wraps around the elastomeric bearing, and the bolted hole attachment zone. The yoke derives damage tolerance in the wraparound area from the inherent safety of the all unidirectional glass fiber in this zone. At loads beyond ultimate the glass fiber can delaminate, but will maintain full load capability with only a stiffness reduction occurring. In the attachment area the yoke provides damage tolerance in two ways. The first is through the use of a clevis attachment to the torque tube flanges. Each half of the clevis is capable of carrying the load if the other half were to fail. In addition to being redundant, the structure is inherently crack resistant from the interleaving of the glass fiber and graphite fiber portions.

The use of the clevis design has other damage tolerant ramifications. By providing a double lap joint between the yoke and the torque tube arms the structure is evenly loaded even if the attachment bolts are untorqued. By using separate bolts for the top and bottom attachments, the attachment joint effectively becomes redundant such that the loss of one bolt will not jeopardize the strength of the hub.

The yoke of the present invention has many advantages over those used in existing metal hubs. The first and foremost is the damage tolerant features which are built into the yoke which are in addition to the safe life (overall part life) design. The composite yoke weight projection will result in significant weight savings in addition to being stronger and lighter than existing systems. The number of parts will also be reduced. Materials and manufacturing costs should be lower than with existing systems and due to the simpler design and greater accessability it will be easier to replace parts. The inherent damage tolerance of the composite yoke will extend the useful life of the hub and improve the repairability which will also reduce the operational costs.

The torque tube is formed by filament winding on a mandrel preferably in the shape of two torque tubes with their larger cross-sectional areas face to face. This allows filament winding of the two tubes at once, which are then separated by cutting before (or after) curing. Initially, the glass fiber filament is wound on the mandrel in a +45° angle on the first pass and a −45° angle on the return pass. This angle can vary as much as ±10°, but is preferrably ±5° to ±7°. As stated above, the glass fiber bundle tow is approximately ⅛ inch in width and 0.0125 inch thick, curable to a thickness of 0.010 inch.

While any number of passes can be made on the mandrel, the number of passes is determined by the sidewall and overall thickness desired which in turn is based on the overall strength and stiffness desired in the torque tube. This in turn is determined by the particular rotor system the component is being designed for. Typically the stiffness in the torque tube is designed to duplicate the stiffness of the metal parts being replaced, for example, the spindle cuff, etc.

After the first layer of glass fiber is applied, the first pack of graphite fibers is laid up. The in-plane orientation of the graphite fiber is such that approximately 40% to 50% of the graphite fiber based on total fiber content of the torque tube is in the 0° orientation. Taking into account the already laid-up glass fibers, the graphite plies are laid up in the 0°, ±45° orientation. Following the laying up of the graphite plies or packs of plies, the glass fibers are again filament wound as in the initial laying. Following this filament winding, graphite packs are again layed up as in the initial graphite pack laying. And finally, glass fiber filament winding is repeated as in the winding of the first two glass fiber lay-ups. If desired, as a back-up redundancy (or crack-stopper), additional layers of glass fiber (in tape form) can be interleaved between the plies or packs of graphite fibers as they are being laid up, the number and locations of the glass fiber layers being dictated by the projection of particular loads to be applied. A typical thickness of fiber lay ups is 0.05 inch thick for each of the first two glass fiber filament windings and 0.06 inch thick for the last glass fiber filament winding (this is cured out thickness) with the graphite packs each representing a thickness of about 0.2 inch.

The thus formed torque tubes are then conventially autoclave cured and appropriate bolt hole attachments provided. A conventional vacuum bag can be used during curing to assist in holding the torque tube component parts in place.

As with the yoke typically epoxy resin systems are used which cure at about 340° F. to about 360° F., at pressures of about 60 psig to about 100 psig, in about 2 to about 4 hours. In this instance, the entire assembly is placed in an autoclave and heated to approximately 350° F. at approximately 80 psig for approximately 2 hours to compress the assembly and cure the epoxy resin. The result is a torque tube requiring only drilling of the attachment holes, and local machining at each end.

The torque tube damage tolerant features are three fold. First, the main load carrying members of the graphite are interleaved with the unidirectional fiberglass which provides crack resistance. Second, both the upper and lower load packs are separated by one of the three wraps of ±45° fiberglass which also surround the packs both inside and outside. This results in both redundant load paths and crack growth prevention from one pack to another. Third, the upper and lower packs are a combination of unidirectional and ±45° graphite and fiberglass. Should damage occur to the cross ply fiberglass torque box the upper and lower main structural packs are structurally sufficient to transmit the pitch load. The above redundant/damage tolerant features apply both in the main body of the torque tube and in the bolt hole attachment areas at either end.

Figure 6:
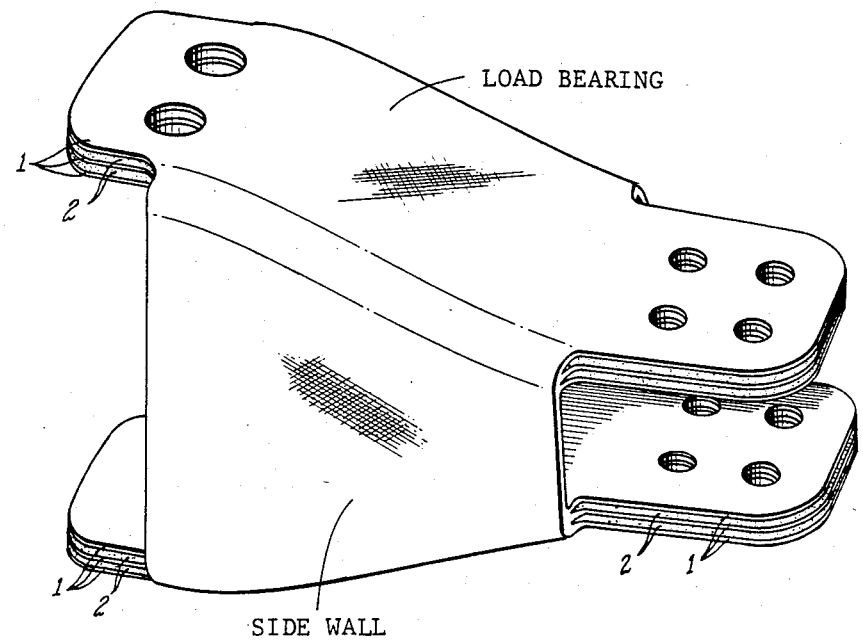
FIG. 6 shows a composite torque tube according to the present invention.

In FIG. 6 a torque tube according to the present invention is shown with the glass fiber windings shown as 1 and the graphite packs as 2. In FIG. 1 showing a composite rotor hub assembly, the torque tubes according to the present invention are shown as indicated. As can be seen from the Figures, the torque tube has primarily a box shaped cross-section of decreasing cross-sectional area i.e. tapered, with rounded edges. Each end terminates with a set of attachment flanges and the torque tube is aerodynamically (smooth) shaped with low drag.

The torque tube of the present invention has many advantages over the existing metal hubs used. The first and foremost is the damage tolerant features which are built into the torque tube which are in addition to the safe life (overall part life) design. The composite torque tube weight projection will result in significant weight savings in addition to being stronger and lighter than existing systems. The number of parts will also be reduced. Materials and manufacturing costs should be lower than with existing systems and due to the simpler design and greater accessability it will be easier to replace parts. The inherent damage tolerance of the composite torque tube will extend the useful life of the hub and improve the repairability which will also reduce the operational costs.

In addition to the above recited components, also shown in FIG. 1 are conventional elastomeric bearings as are currently used with conventional metal parts; a conventionally functioning metal horn, which can also be made of composite material which provides support for the interior of the torque tube; and upper and lower plate material which provide attachment points for dampers and mounting points for scissors lugs and bifilar components. The upper and lower plates are of substantially the same construction as the main retention plate minus the glass fibers and are formulated by hot pressing in similar fashion.

Being constructed in similar fashion as the retention plate, the upper and lower plates would be isotropic in-plane. As with the other components, the thickness and particular design would depend primarily on the applied load, including the damper load, these plates would see. As seen from FIG. 1 the arms of the plates extend between the yokes and the plates rest on the retention plate. As shown in FIG. 1 the plates are bonded, for example with similar epoxy as described above, to the retention plates, although they can be bolted through drilled holes through the retention plate. Note, for example, smaller holes present around the central shaft opening shown in the plies of FIG. 2. It should also be noted that the commercially available elastomeric bearings can be either natural rubber, synthetic rubber, or a blend of the two.

Although this invention has been shown and described with respect to detailed embodiments thereof, it will be understood by those skilled in the art that various changes in form and detail thereof may be made without departing from the spirit and scope of the claimed invention.

We claim:

1. A main helicopter rotor hub having a main retention plate, at least two yokes and at least two torque tubes, wherein the main retention plate comprises a fiber reinforced epoxy resin matrix having a plurality of layers of:

a. graphite fiber reinforcement comprising in-plane isotropically laid continuous graphite fibers, b. glass fiber reinforcement comprising a plurality of fiberglass segments circumferentially wound around a central axis in a plane substantially parallel to the plane of the graphite fiber reinforcement, said layers of graphite and glass fiber reinforcement symmetrically interleaved so as to produce crack resistance, damage tolerance, and integrity inspectability to the retention plate; wherein the yokes comprise a U-shaped fiber reinforced epoxy matrix composite containing unidirectionally oriented continuous glass fibers, oriented in the direction of principal stress along the length of the yoke, the yoke having clevis sections at either end, each clevis section containing multiaxially oriented multiple plies of unidirectionally oriented continuous graphite fibers interleaved with the continuous glass fibers so as to produce a crack resistant, damage tolerant, integrity inspectable yoke; and wherein the torque tubes comprise a graphite and glass fiber reinforced epoxy resin matrix composite having upper and lower main load bearing portions connected by two sidewall portions, the sidewall and load bearing portions comprising an epoxy resin matrix reinforced with approximately ±45° oriented continuous filament wound glass fibers, the load bearing portions comprising a plurality of multiaxially oriented plies of unidirectionally oriented continuous graphite fibers interleaved with the filament wound glass fibers thus forming a torque tube which is crack resistant, damage tolerant and integrity inspectable.

* * * * *